(12) United States Patent
Ji et al.

(10) Patent No.: US 9,350,497 B2
(45) Date of Patent: May 24, 2016

(54) METHOD AND APPARATUS FOR TRANSMITTING HARQ ACKNOWLEDGEMENT IN OFDM RADIO COMMUNICATION SYSTEM

(75) Inventors: Hyoungju Ji, Seoul (KR); Jinkyu Han, Seoul (KR); Youngbum Kim, Seoul (KR); Joonyoung Cho, Gyeonggi-do (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/552,125

(22) Filed: Jul. 18, 2012

(65) Prior Publication Data

US 2013/0021994 A1    Jan. 24, 2013

(30) Foreign Application Priority Data

Jul. 18, 2011 (KR) .......................... 10-2011-0071100

(51) Int. Cl.
| | | |
|---|---|---|
| *H04W 72/04* | (2009.01) | |
| *H04L 1/18* | (2006.01) | |
| *H04L 1/00* | (2006.01) | |
| *H04L 1/16* | (2006.01) | |
| *H04L 5/00* | (2006.01) | |

(52) U.S. Cl.
CPC ............ *H04L 1/1854* (2013.01); *H04L 5/0055* (2013.01); *H04L 1/001* (2013.01); *H04L 1/0026* (2013.01); *H04L 1/0027* (2013.01); *H04L 1/0038* (2013.01); *H04L 1/0071* (2013.01); *H04L 1/0073* (2013.01); *H04L 1/1671* (2013.01); *H04L 1/1812* (2013.01); *H04L 5/0007* (2013.01)

(58) Field of Classification Search
None
See application file for complete search history.

(56) References Cited

U.S. PATENT DOCUMENTS

| | | | | |
|---|---|---|---|---|
| 7,778,148 | B2 * | 8/2010 | Lee et al. ...................... | 370/204 |
| 7,852,806 | B2 * | 12/2010 | Ahn et al. ..................... | 370/329 |
| 7,881,222 | B2 * | 2/2011 | Lee et al. ...................... | 370/252 |
| 8,423,044 | B2 * | 4/2013 | Lee et al. ................... | 455/456.1 |
| 2009/0201904 | A1 * | 8/2009 | Lee et al. ...................... | 370/342 |
| 2009/0274037 | A1 * | 11/2009 | Lee et al. ...................... | 370/208 |
| 2010/0002647 | A1 | 1/2010 | Ahn et al. | |
| 2010/0332937 | A1 * | 12/2010 | Dai et al. ...................... | 714/749 |
| 2011/0151910 | A1 * | 6/2011 | Kim et al. ..................... | 455/509 |

(Continued)

FOREIGN PATENT DOCUMENTS

| | | |
|---|---|---|
| CN | 101594215 | 12/2009 |
| CN | 101938793 | 1/2011 |

(Continued)

OTHER PUBLICATIONS

3GPP TSG RAN WG1 , Jan. 12, 2010, Phich resource allocation in LTE-A, R!-100081, pp. 1-3.*

(Continued)

*Primary Examiner* — Ian N Moore
*Assistant Examiner* — Lakeram Jangbahadur
(74) *Attorney, Agent, or Firm* — The Farrell Law Firm, P.C.

(57) ABSTRACT

A Physical Hybrid Automatic Repeat reQuest (ARQ) Indicator CHannel (PHICH) transmission method performed by a base station is provided. The method includes determining whether any PHICH resources are allocated to a current subframe; allocating, upon a determination that the current subframe does not have any PHICH resources allocated, a new PHICH resource; and transmitting a PHICH through the allocated new PHICH resource.

12 Claims, 11 Drawing Sheets

(56) References Cited

U.S. PATENT DOCUMENTS

| | | | | |
|---|---|---|---|---|
| 2012/0033643 | A1* | 2/2012 | Noh et al. | 370/335 |
| 2012/0033650 | A1* | 2/2012 | Ahn et al. | 370/336 |
| 2012/0170479 | A1* | 7/2012 | Ren et al. | 370/252 |
| 2013/0176917 | A1* | 7/2013 | Lee et al. | 370/280 |
| 2013/0195021 | A1* | 8/2013 | Kalfon et al. | 370/329 |
| 2013/0265949 | A1* | 10/2013 | Lee | 370/329 |

FOREIGN PATENT DOCUMENTS

| | | |
|---|---|---|
| KR | 1020090017450 | 2/2009 |
| KR | 1020100051530 | 5/2010 |
| KR | 1020110001890 | 1/2011 |
| KR | 1020110070768 | 6/2011 |
| WO | WO 2009/022879 | 2/2009 |
| WO | WO 2010/124242 | 10/2010 |
| WO | WO 2011/002218 | 1/2011 |

OTHER PUBLICATIONS

ASUSTeK, "PHICH Resource Allocation in LTE-A", R1-100081, 3GPP TSG RAN WG1 Meeting #59bis, Jan. 18-22, 2010.
European Search Report dated Feb. 9, 2015 issued in counterpart application No. 12815576.9-1851.
Chinese Office Action dated Jan. 27, 2016 issued in counterpart application No. 201280035814.8, 13 pages.

* cited by examiner

METHOD AND APPARATUS FOR TRANSMITTING HARQ ACKNOWLEDGEMENT IN OFDM RADIO COMMUNICATION SYSTEM

PRIORITY

This application claims priority under 35 U.S.C. §119(a) to a Korean Patent Application filed in the Korean Intellectual Property Office on Jul. 18, 2011 and assigned Serial No. 10-2011-0071100, the entire contents of which are incorporated herein by reference.

BACKGROUND OF THE INVENTION

1. Field of the Invention

The present invention relates generally to Hybrid Automatic Repeat reQuest (HARQ) feedback, and more specifically, to a HARQ acknowledgement feedback method and apparatus in an Orthogonal Frequency Division Multiplexing (OFDM) radio communication system.

2. Description of the Related Art

Mobile communication systems have been developed to provide mobile subscribers with voice communication services. With the rapid advance of technologies, mobile communication systems have evolved to support high-speed data communication services as well as the standard voice communication services. The limited availability of resources, in addition to user requirements for services at higher speeds in the current mobile communication system is spurring progress to more advanced mobile communication system.

Long Term Evolution-Advanced (LTE-A) is a next generation mobile communication standard that is being developed in order to meet such user requirements. LTE-A is being standardized by the $3^{rd}$ Generation Partnership Project (3GPP). LTE-A is a technology for realizing high speed packet-based communication at about up to 1 Gbps. In order to achieve LTE-A deployment, LTE-A developers are discussing several communication schemes, such as network multiplexing for deploying multiple overlapped evolved Node Bs (eNBs) in a specific area and increasing the number of frequency bands supported by each eNB.

Orthogonal Frequency Division Multiplexing (OFDM) is a transmission technique for transmitting data using multiple carriers (i.e., a multicarrier data transmission technique) that parallelizes a serial input stream into parallel data streams and modulates the parallel data streams onto orthogonal multiple carriers (i.e., sub-carrier channels).

Multicarrier modulation schemes originated in the late 1950's with the use of microwave radio for military communication purposes. OFDM using orthogonal overlapping multiple subcarriers has developed since the 1970's, but is limited in applications to real-world systems, due to the difficulty in implementing orthogonal modulations between multiple carriers. With the introduction of the idea of using a Discrete Fourier Transform (DFT) for implementing the generation and reception of OFDM signals in 1971, OFDM technology has rapidly developed. Additionally, the introduction of a guard interval at the start of each symbol and use of Cyclic Prefix (CP) overcomes the negative effects caused by multipath signals and delay spread.

Due to such technical advances, OFDM technology has been applied in various digital communications fields such as Digital Audio Broadcasting (DAB), Digital Video Broadcasting (DVB), Wireless Local Area Network (WLAN), and Wireless Asynchronous Transfer Mode (WATM). The implementation complexity of OFDM has been reduced by the introduction of various digital signal processing technologies such as Fast Fourier Transform (FFT) and Inverse Fast Fourier Transform (IFFT).

OFDM is similar to Frequency Division Multiplexing (FDM), but OFDM is much more spectrally efficient in achieving high speed data transmissions by overlapping multiple subcarriers orthogonally. Due to the spectral efficiency and robustness to the multipath fading, OFDM has been considered as a prominent solution for broadband data communication systems.

OFDM is advantageous due to the ability to control the Inter-symbol Interference (ISI) using guard intervals and to reduce the complexity of equalizers in view of hardware as well as spectral efficiency and robustness to the frequency selective fading and multipath fading. OFDM is also robust to impulse noise when employed in various communication systems.

In wireless communications, high-speed, high-quality data services are generally hindered by channel environments. In wireless communications, channel environments suffer from frequent changes, not only due to additive white Gaussian noise (AWGN), but also due to power variations of received signals caused by a fading phenomenon, shadowing, a Doppler effect brought by movement of a User Equipment (UE), a frequent change in a velocity of the UE, interference by other users or multipath signals, etc. Therefore, in order to support high-speed, high-quality data services in wireless communication, there is a need to efficiently overcome the above channel quality degradation factors.

In OFDM, modulation signals are located in two-dimensional time-frequency resources. Resources on the time domain are divided into different OFDM symbols, and are orthogonal with each other. Resources on the frequency domain are divided into different tones, and are also orthogonal with each other. An OFDM scheme defines one minimum unit resource by designating a particular OFDM symbol on the time domain and a particular tone on the frequency domain, and the unit resource is called a Resource Element (RE). Since different REs are orthogonal with each other, signals transmitted on different REs can be received without causing interference to each other.

A physical channel is a channel defined on the physical layer for transmitting modulation symbols obtained by modulating one or more coded bit sequences. In an Orthogonal Frequency Division Multiple Access (OFDMA) system, a plurality of physical channels can be transmitted depending on the usage of the information sequence or receiver. The transmitter and receiver determine REs on which a physical channel is transmitted, and this process is called mapping.

LTE and LTE-A systems are representative systems adopted OFDM in downlink and Single Carrier-Frequency Division Multiple Access (SC-FDMA) in uplink.

Meanwhile, in an LTE Time Division Duplexing (TDD) system, each eNB's HARQ acknowledgement transmission timing corresponding to the data transmitted by a UE is determined at uplink transmission timing and transmitted at predetermined downlink subframes. In the LTE-A TDD system, however, it is necessary to allow transmission of the HARQ acknowledgement at all of the subframes to prepare the eNB traffic adaptively and support multicarrier transmission. Due to the backward compatibility problem of the legacy UE, it is impossible to transmit HARQ acknowledgement designed for legacy systems at subframes that do not have any HARQ acknowledgement channels. Therefore, there is a need for a novel HARQ acknowledgement channel transmission method for guaranteeing HARQ acknowledgement performance or control channel reception while supporting backwards compatibility with legacy UEs.

SUMMARY OF THE INVENTION

The present invention has been made in an effort to solve the above problem and it is an object of the present invention to provide a method and apparatus for transmitting HARQ acknowledgement channel that enables evolved UEs to receive the HARQ acknowledgement channel in the legacy control channel without influencing the control channel reception at the legacy UE.

In accordance with an aspect of the present invention, a Physical Hybrid Automatic Repeat reQuest (ARQ) Indicator CHannel (PHICH) transmission method performed by a base station is provided. The method includes determining whether any PHICH resources are allocated to a current subframe; allocating, upon a determination that the current subframe does not have any PHICH resources allocated, a new PHICH resource; and transmitting a PHICH through the allocated new PHICH resource.

In accordance with another aspect of the present invention, a Physical Hybrid Automatic Repeat reQuest (ARQ) Indicator CHannel (PHICH) reception method performed by a terminal is provided. The method includes determining whether any PHICH resources are allocated to a current subframe; allocating, upon a determination that the current subframe does not have any PHICH resources, a new PHICH resource; and receiving a PHICH through the allocated new PHICH resource.

In accordance with another aspect of the present invention, a base station for transmitting a Physical Hybrid Automatic Repeat reQuest (ARQ) Indicator CHannel (PHICH) is provided. The base station includes a controller for determining whether any PHICH resources are allocated to a current subframe; a selector for allocating, upon a determination that the current subframe does not have any PHICH resources, a PHICH resource; and a transmitter for transmitting a PHICH on the allocated PHICH resource.

In accordance with still another aspect of the present invention, a terminal for receiving a Physical Hybrid Automatic Repeat reQuest (ARQ) Indicator CHannel (PHICH) is provided. The terminal includes a controller for determining whether any PHICH resources are allocated to a current subframe, and allocating, upon a determination that the current subframe does not have any PHICH resources, a new PHICH resource; and a PHICH receiver for receiving a PHICH through the allocated new PHICH resource.

DETAILED DESCRIPTION OF EMBODIMENTS OF THE PRESENT INVENTION

Embodiments of the present invention are described as follows with reference to the accompanying drawings in detail. Detailed description of well-known functions and structures incorporated herein may be omitted to avoid obscuring the subject matter of the present invention. This aims to omit unnecessary description so as to make the subject matter of the present invention clear.

Terms or words used in the specification and claims herein are not limited to general and lexical meanings, but are to be construed according to meanings and concepts corresponding to the present invention.

Although the following description is directed to the LTE and LTE-A systems, embodiments of the present invention can be applied to other radio communication systems supporting base station scheduling without departing from the scope of the present invention.

Figure 1:
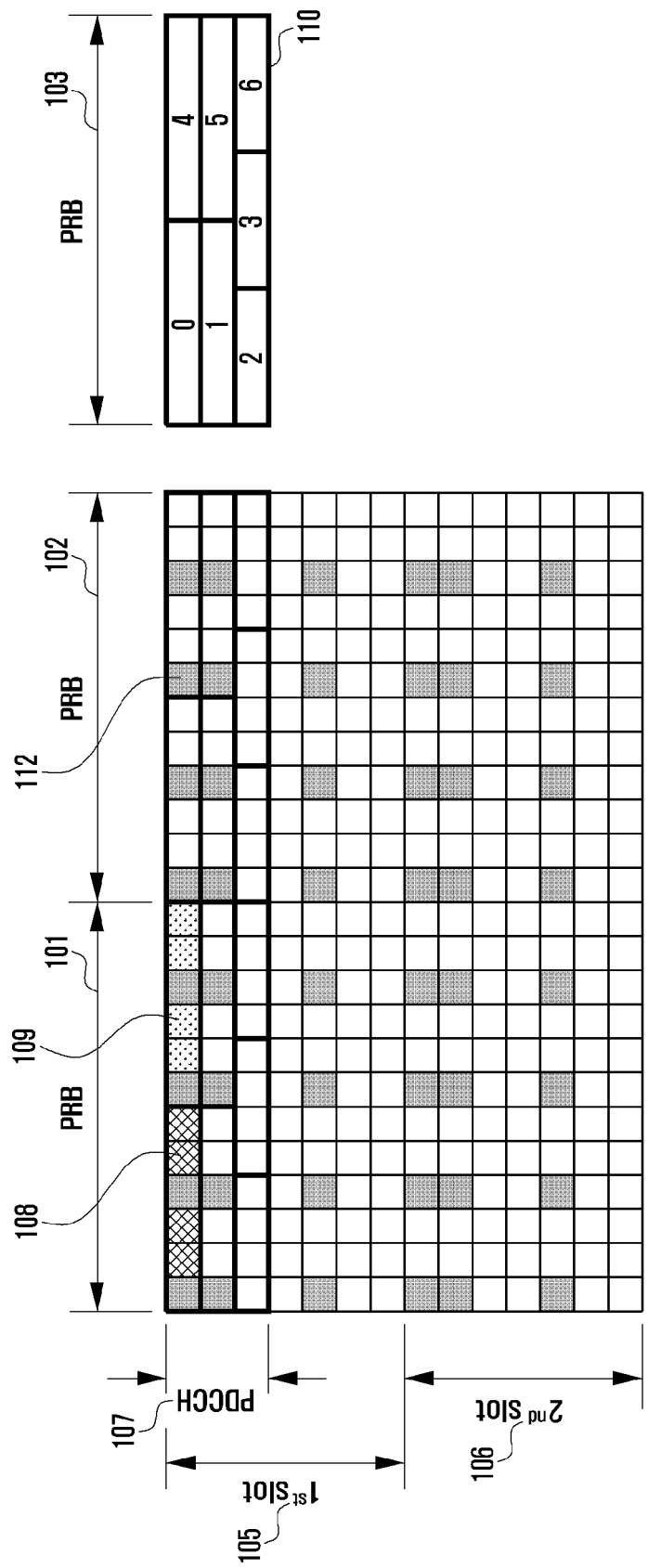
FIG. 1 is a diagram illustrating a control channel structure of a subframe for use in the LTE system according to an embodiment of the present invention.

FIG. 1 is a diagram illustrating a control channel structure of a subframe for use in the LTE system according to an embodiment of the present invention.

The subframe of FIG. 1 is configured to support backward compatibility with respect to LTE-A systems.

Referring to FIG. 1, an entire downlink transmission bandwidth includes a plurality of Resource Blocks (RB). Each RB 101 and 102 includes twelve frequency tones in frequency domain and twelve or fourteen OFDM symbols in time domain. The frequency tone and OFDM symbol are basic resource units. A subframe is 1 msec in length and includes two 0.5 msec slots.

A Reference Signal (RS) is a signal transmitted from an eNB and can be used by the UE to estimate the instantaneous downlink channel conditions. In the LTE system, the RS can be categorized into one of Common RS (CRS) and Dedicated RS (DRS). The CRS 112 is transmitted through antenna ports 0 and 1 of the eNB with two antennas or through antenna ports 0, 1, 2, and 3 of the eNB with four antennas. In case of multi-antenna transmission, the eNB uses multiple antenna ports. The absolute positions of the RS in the RB are configured differently according to the cell while maintaining relative interval between RSs. More specifically, the RS of the same antenna port is transmitted at an interval of 6 RBs. The reason why the absolute position of the RS is configured differently among the cell is to avoid collision of the RSs of different cells. The number of RSs varies according to the number of antenna ports.

The eight RSs are used when using the antenna ports 0 and 1 in one RB and subframe and four RSs are used when using antenna ports 2 and 3. The mobile communication may be designed such that all UEs can receive a CRS. The CRS is transmitted in every resource block in the frequency domain thus covering the entire cell bandwidth.

In an LTE system according to an embodiment of the present invention, a control channel signal is transmitted at the beginning of a subframe that includes a plurality of physical channels in time domain. In FIG. 1, reference number 107 denotes a region for carrying the control channel signal. The control channel signal can be carried by L OFDM symbols at the beginning of the subframe. L may be 1, 2, or 3. In the example according to FIG. 1, L is 3. When the control channel amount is small enough to be carried by one OFDM symbol, the one OFDM symbol at the beginning of the subframe is used for control channel signal transmission (L=1). In this case, the remaining thirteen OFDM symbols are used for data channel signal transmission. The value of L is used as the basic information for allocated control channel resource demapping in the control channel reception operation. If the receiver fails to receive the value of L, it is impossible to recover the control channel. The reason for transmitting the control channel signal at the beginning of the subframe is to allow for the UEs to decode downlink scheduling assignments as early as possible. When no downlink scheduling assignment is received, the UE determines that there is no need to perform data channel signal reception operation, resulting in power conservation. Receipt of the control channel is prior to the data channel enables reduction of scheduling delays.

The control channels include Physical Control Format Indicator Channel (PCFICH) 108, Physical Hybrid ARQ Indicator Channel (PHICH), and Physical Downlink Control Channel (PDCCH). The PCFICH 108 carries the value of L and provides the UE with the information necessary to decode the PDCCHs. The PCFICH 108 is carried at the first symbol. The PCFICH 108 is transmitted at an interval of 4 REs across the entire bandwidth. The PCFICH 108 is transmitted at the positions fixed according to the cell index and thus the UE can receive the PCFICH 108 with the cell index of the connected cell.

The receiver must know the position of the PHICH as well as PCFICH 108 in order to decode PDCCH. Accordingly, the information indicating the PHICH duration and PHICH resource is transmitted through a physical broadcast channel before the PCFICH transmission. With this information, the UE can check the position of the HARQ acknowledgement channel. Typically, eight PHICHs are transmitted as a PHICH group. One PHICH group is repeatedly transmitted three times for transmission diversity across an entire bandwidth. Once the PHICH duration and PHICH resource are determined, the PHICH duration indicates the position of the PHICH in the time domain and the PHICH resource (Ng∈{⅙, ½, 1, 2}) indicates the resource amount. The number of actual PHICH groups can be calculated based on the indicated PHICH resource amount as expressed by Equation (1):

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad (1)$$

where $N_{RB}^{DL}$ denotes the total number of RBs for use in downlink.

In order to allocate PHICH resource and indicate the PHICH location, an RE Group (REG) is used. Each REG contains 4 REs (which may be separated by an RS) consecutive in frequency domain within the same OFDM symbol. In case that the REs are separated by an RS, the REG contains a total six REs as denoted by reference numbers 108 and 109. Accordingly, each REG includes four REs other than the two REs to which RSs are mapped. In order to allocate the REG resource, the REGs are assigned indices in each Physical Resource Block (PRB) 101 as denoted by reference number 103. In case that three OFDM symbols are assigned for the control channel region as denoted by reference number of 107, the REG index is designated in time axis first order. The REGs are assigned indices in temporal order. As denoted by reference number 110, the REGs 0, 1, and 2 located at the left part of PRB 103 are assigned indices first. The REG 3 is assigned its index next, followed by REGs 4, 5, and 6. Once all of the REGs are assigned indices in one PRB, the REGs of the next PRB are assigned indices continuously.

The PDCCH 107 is a physical channel for transmitting a common control channel and a dedicated control channel including data channel allocation information, allocation information for system information transmission or power control information. The PDCCH 107 can be configured with different channel coding rates depending on the channel state of the UE. Since the Quadrature Phase Shift Keying (QPSK) is fixedly used for PDCCH transmission, it is necessary to change the resource amount in order to change the channel coding rate. When a UE is operating in good a channel condition, the UE uses a high channel coding rate to reduce the amount of resources. Meanwhile, a UE operating in a bad channel condition uses a low channel coding rate to although fewer resources are used. The resource amount for each PDCCH is determined according to the unit of Control Channel Element (CCE). A CCE includes a plurality of Resource Element Groups (REGs) 110. The REG of PDCCH is interleaved to guarantee diversity and distribute inter-cell interference. With the exception of the REGs used for PCFICH and PHICH, the remaining REGs are allocated for PDCCH on the control channel resource across the entire downlink bandwidth.

The interleaving is performed with respect to all of the REGs of the subframe, as determined by L. The output of the control channel interleaving is designed to space the REGs of the control channel allocated across one or more symbols far enough apart to acquire diversity gain while avoiding inter-cell interference caused by use of the same interleaver for the cells. Also, the interleaving guarantees uniform distribution of the REGs within the same channel across the per-channel symbols.

Figure 2:
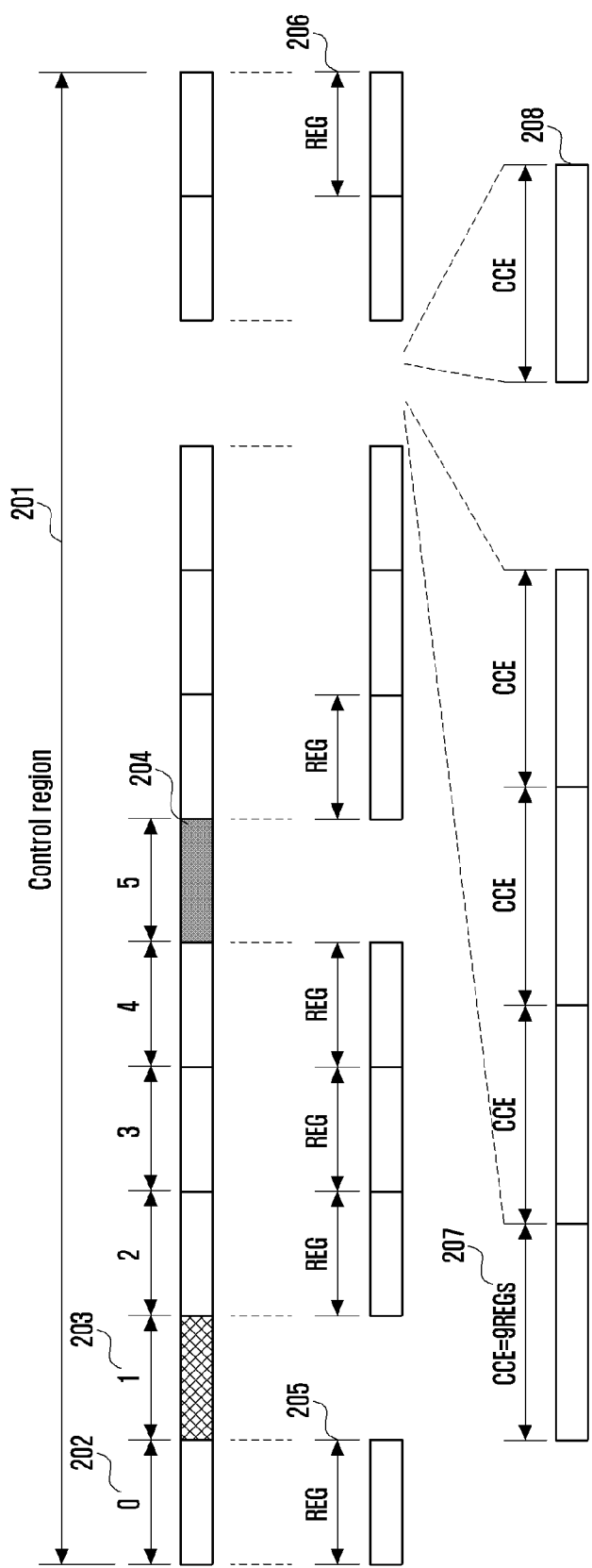
FIG. 2 is a diagram illustrating a principle of the control channel resource configuration according to an embodiment of the present invention.

FIG. 2 is a diagram illustrating a principle of the control channel resource configuration according to an embodiment of the present invention.

Referring to FIG. 2, the LTE control channels can be depicted as a logical region as denoted by reference number 201 in FIG. 2. In the control region, the minimum resource unit is an REG as denoted by reference numbers 202, 203, and 204. The REGs 203 and 204 of the control region are allocated for PCFICH and PHICH, and then the remaining control region resources are allocated for PDCCHs. With the REGs remained after allocation for PCFICH and PHICH, each CCE contains 9 consecutive REGs and is a basic resource unit for PDCCH allocation. The number of REGs included in each CCE is a multiple of 9. The control channel region is divided into a Common Control Channel Region and a Dedicated Control Channel Region. For the common control channel region, all UEs always attempt control channel demodulation. The dedicated control channel region is UE-specific such that each UE attempts demodulation at corresponding dedicated control channel regions. The common control channel has total 16 CCEs assigned CCE indices 0 to 15. The remaining CCEs are used for the dedicated control region. In the LTE system, the coding rate of the control channel is not fixed, but is determined according to the amount of information resources, using a unit of aggregation level. The aggregation level indicates the number of CCEs.

With respect to the common control channel, aggregation level 4 or 8 can be used. With respect to the dedicated control channel, aggregation level 1, 2, 4, or 8 can be used. In the common control channel region, the number of blind decoding operations varies according to the aggregation level. For the common control channel region of aggregation level 4, the blind decoding can be made at 4 search spaces. For the common control channel region of aggregation level 8, the blind decoding can be made at 2 search spaces. Accordingly, it is possible to transmit the common control channel at six search spaces for blind decoding. With respect to the UE-specific control channel, the number of search spaces is determined according to the aggregation level. For the aggregation levels 1 and 2, total 6 search spaces are available and, for the aggregation levels 4 and 8, total 2 search spaces. The blind decoding can be attempted at the same or different CCEs per aggregation level. This can be summarized as table 1. Table 1 shows the configurations of control channel search spaces in the LTE system.

TABLE 1

| | Search Space $S_k^{(L)}$ | | |
|---|---|---|---|
| Type | Aggregation Level L | Size (CCE unit) | # of PDCCH candidates $M^{(L)}$ candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Figure 3:
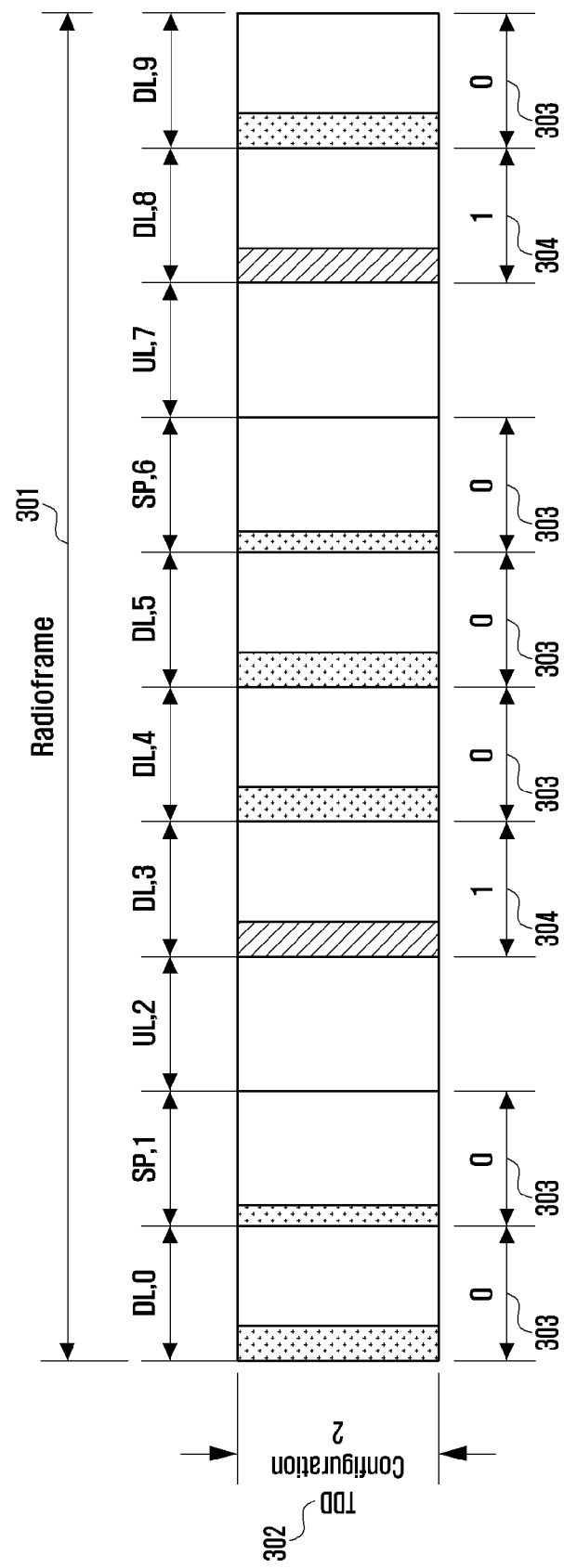
FIG. 3 is diagram illustrating a radio frame composed of subframes with or without PHICH in the LTE/LTE-A system operating in a TDD mode according to an embodiment of the present invention.

FIG. 3 is diagram illustrating a radio frame including subframes with or without PHICH in an LTE/LTE-A system operating in a DD mode according to an embodiment of the present invention.

Referring to FIG. 3, the LTE TDD system supports seven UpLink (UL)-DownLink (DL) configurations. According to the number of UL subframes, there may be subframes that are not involved in any uplink HARQ process. If HARQ acknowledgement transmission is necessary in response to the data transmitted by a UE at a certain uplink subframe, and if the number of uplink subframes is less than the number of the downlink subframes, some downlink subframes are not needed to carry the HARQ acknowledgement channel. In a Frequency Division Duplexing (FDD) mode, the uplink subframes are carried on the frequency band different from the frequency band carrying downlink subframes, and thus there is a need for the HARQ acknowledgement channel at every subframe. However, in the TDD mode, a HARQ is not required at every subframe. Accordingly, Release 8 of the LTE specification specifies the available HARQ acknowledgement channel resource amount per DL subframe according to the TDD UL-DL configuration. Table 2 shows the PHICH group resource amounts in TDD mode.

TABLE 2

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

The total amount of resources is obtained by multiplying a value of Table 2 by a value calculated with Equation (1). For example, in TDD UL-DL configuration 2, the value corresponding to the subframe 303 of the radio frame 301 is 0 (m'=0) in table 2. Also, the value corresponding to the subframe 304 is 1 (m'=0) in table 2. Accordingly, the subframe 304 is designated for PHICH resource while the subframe 303 is not designated for PHICH resource. In this case, a legacy LTE UE (prior to Release 10 of the LTE specification) can receive PCFICH, PHICH, and PDCCH at subframe 304 but not at subframe 303. However, the LTE-A system supports multicarrier transmission at different TDD subframes and supports multiple TDD UL-DL configurations on a single carrier according to the data traffic amount.

Suppose that there are multiple TDD carrier transmissions with TDD configurations 1 and 2. At the subframe 1, no PHICH resource is assigned in the TDD UL-DL configuration 2, while one PHICH resource is assigned in the TDD UL-DL configuration 1. In case that it is necessary to transmit PHICH on a single carrier for TDD UL-DL configurations 1 and 2 using cross-carrier scheduling, the PHICH transmission is possible in the TDD UL-DL configuration 1 but not in the TDD UL-DL configuration 2. In this case, the eNB is restricted in scheduling operation so as to fail to provide efficient multicarrier transmission. Furthermore, since the UE must always receive the control channel in the TDD UL-DL configuration 1 to receive PHICH, the UEs are concentrated on a single carrier.

In order to address this problem, the subframe 0 may be designated for resource allocation by modifying Table 2. In this case, the legacy UE is not aware of such modification so as to attempt receipt of the control channel under the assumption of no existence of extended phich. Since the PHICH and PDCCH resources are allocated independently, the two channels collide with each other. In this case, the legacy UE undergoes PDCCH reception performance degradation and the evolved UE fails to simultaneously receive both the PHICH and PDCCH.

Although it is preferred to transmit the control channels without collision, it is difficult to guarantee such a condition for all UEs. Accordingly, according to an embodiment of the present invention, PHICH resources are configured while minimizing collision with PDCCH in transmitting extended PHICH.

Figure 4:
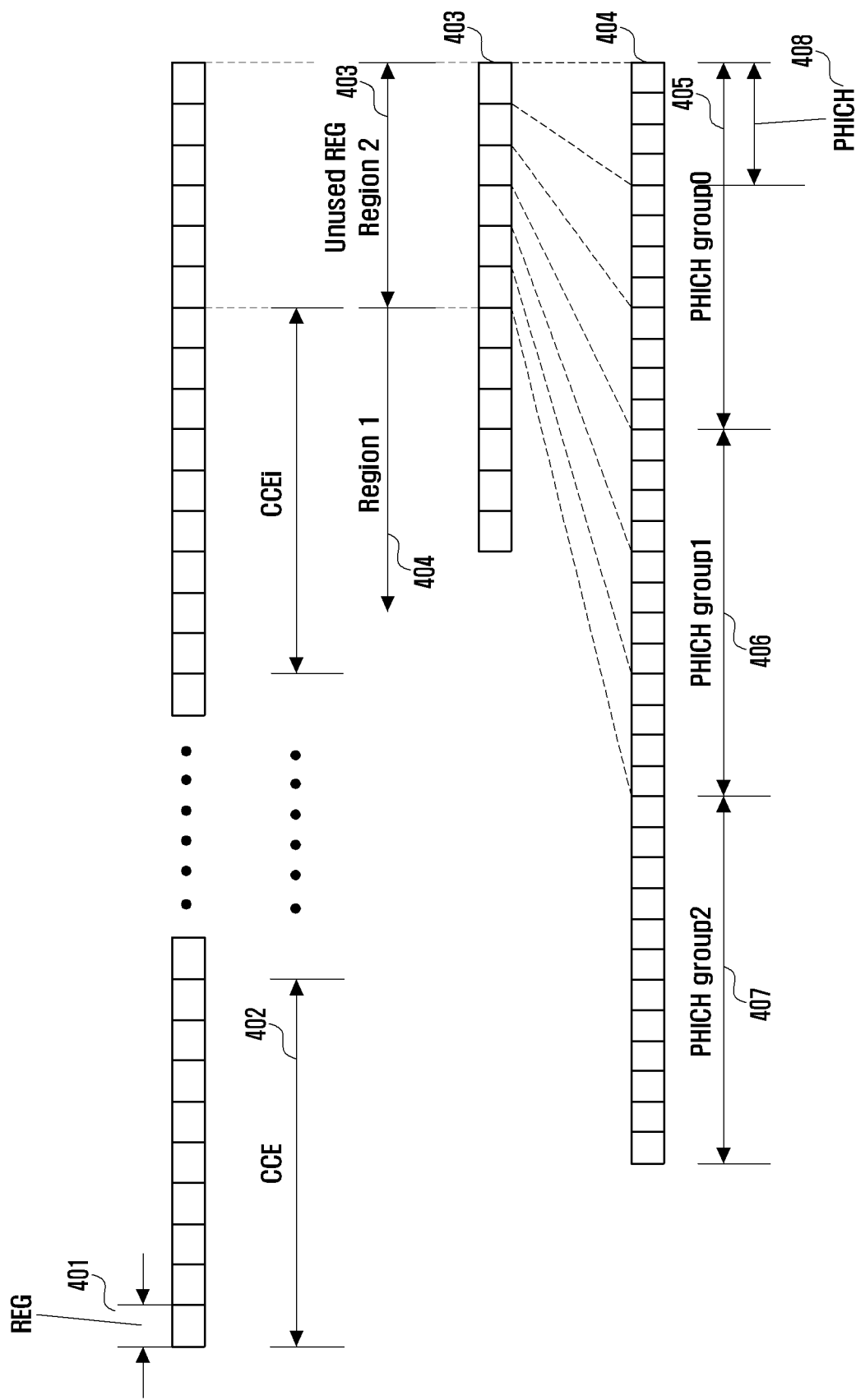
FIG. 4 is a diagram illustrating a principle of PHICH resource allocation in the HARQ acknowledgement transmission method according to an embodiment of the present invention.

FIG. 4 is a diagram illustrating a principle of PHICH resource allocation in a HARQ acknowledgement transmission method according to an embodiment of the present invention.

FIG. 4 shows a control channel region of a downlink subframe without any legacy PHICH. The control channel region is a set of the REGs 401. 9 REGs constitute a CCE 402 and a PDCCH allocation unit. In FIG. 4, the REGs 401 are the REGs to which the PCFICH is not mapped. The REGs can be divided into a first region 404 and a second region 403. The first region 404 includes the REGs forming the CCE 402. The second region 403 includes the unused REGs remaining without being included in the CCE 402. In the first region 404, each CCE includes nine REGs. Accordingly, if the number of REGs is not a multiple of nine, idle REG 403 occurs. This is the second region 403. The number of REGs varies dynamically at every downlink subframes according to the number of PRBs of the available bandwidth, the number of currently configured RSs, and the value of L carried in PCFICH. In an LTE-A system according to an embodiment of the present invention, the available combinations may be set as follows. The number of PRBs can be one of 6, 15, 25, 50, and 110, and the number of RS ports is 1, 2, or 4.

The L indicated by PCFICH is one of 2, 3, and 4 when the number of PRBs is 6, or one of 1, 2, and 3 in other cases. At this time, the number of REGs remaining after configuring CCE can be divided in units of twelve REs occupied by a PHICH group as shown in Table 3:

TABLE 3

| # of RS port | L value | PRB 6 | PRB 15 | PRB 25 | PRB 50 | PRB 110 |
|---|---|---|---|---|---|---|
| 2 | 1 | x | 1 | 1 | 0 | 1 |
| 2 | 2 | 1 | 1 | 2 | 2 | 0 |
| 2 | 3 | 1 | 1 | 0 | 1 | 2 |
| 2 | 4 | 1 | X | x | x | x |
| 4 | 1 | x | 1 | 1 | 0 | 1 |
| 4 | 2 | 2 | 2 | 0 | 0 | 2 |
| 4 | 3 | 2 | 2 | 1 | 2 | 1 |
| 4 | 4 | 2 | x | x | x | x |

In Table 3, the value 1 indicates that one PHICH group is available. The value 0 indicates that there exists REGs but total number of REGs is less than 3 so as not to form a PHICH group. In Table 3, there is a region that is not used for other control channels at the last part of the REG indices. If the extended PHICH is transmitted at unused REG region 403, this does not influence the PDCCH reception at other UEs and make it possible for the evolved UEs to avoid collision of PHICH and PDCCH. In the first region 404, the PDCCH is transmitted in units of 1, 2, 4, or 8 CCEs. Accordingly, if the number of CCEs in the first region is not a multiple of 8, the last part of the CCEs to which PDCCH is mapped is not used almost. Tables 4, 5, and 6 show the number of CCEs that are not included in the PDCCH search region when the number of CCEs is 2, 4, and 8. Each CCE contains 9 REGs and can carry three PHICH groups.

TABLE 4

| # of RS port | L value | PRB 6 | PRB 15 | PRB 25 | PRB 50 | PRB 110 |
|---|---|---|---|---|---|---|
| 2 | 1 | x | 1 | 1 | 1 | 0 |
| 2 | 2 | 1 | 0 | 1 | 1 | 1 |
| 2 | 3 | 1 | 1 | 0 | 0 | 1 |
| 2 | 4 | 1 | x | x | x | x |
| 4 | 1 | x | 1 | 1 | 1 | 0 |
| 4 | 2 | 0 | 0 | 1 | 0 | 0 |
| 4 | 3 | 0 | 1 | 1 | 0 | 1 |
| 4 | 4 | 0 | x | x | x | x |

TABLE 5

| # of RS port | L value | PRB 6 | PRB 15 | PRB 25 | PRB 50 | PRB 110 |
|---|---|---|---|---|---|---|
| 2 | 1 | x | 3 | 1 | 3 | 0 |
| 2 | 2 | 3 | 0 | 1 | 3 | 1 |
| 2 | 3 | 1 | 1 | 2 | 0 | 1 |

TABLE 5-continued

| # of RS port | L value | PRB 6 | PRB 15 | PRB 25 | PRB 50 | PRB 110 |
|---|---|---|---|---|---|---|
| 2 | 4 | 3 | x | x | x | X |
| 4 | 1 | X | 3 | 1 | 3 | 0 |
| 4 | 2 | 2 | 2 | 3 | 2 | 0 |
| 4 | 3 | 0 | 3 | 2 | 2 | 1 |
| 4 | 4 | 2 | x | x | x | x |

TABLE 6

| # of RS port | L value | PRB 6 | PRB 15 | PRB 25 | PRB 50 | PRB 110 |
|---|---|---|---|---|---|---|
| 2 | 1 | x | 3 | 5 | 3 | 0 |
| 2 | 2 | 3 | 0 | 5 | 3 | 5 |
| 2 | 3 | 5 | 5 | 6 | 4 | 1 |
| 2 | 4 | 7 | x | x | x | x |
| 4 | 1 | X | 3 | 5 | 3 | 0 |
| 4 | 2 | 2 | 6 | 3 | 6 | 0 |
| 4 | 3 | 4 | 3 | 3 | 6 | 5 |
| 4 | 4 | 6 | x | x | x | x |

Accordingly, the last parts of the second region 403 and the first region 404 are likely to have no or little PDCCH resources. By using these regions for extended PHICH transmission, it is possible to minimize the performance of and influence to the UE. The PHICH group allocation method according to this embodiment binds three REGs in the second region first into a PHICH group in descending order of REG index as extended phich group. The PHICH group 0 405 is first assigned resource from a region having the highest REG index in the second region 403. Next, the PHICH group 1 406 is assigned resource in descending order of REG index. This method according to an embodiment of the present invention enables the evolved UE to receive the PHICH while minimizing the influence to the control channel reception performance of the legacy UEs and improves resource utilization by exploiting the resource which is not used for other control channels. In the subframe that does not have any PHICH resources as shown in Table 2, the amount of PHICH resource groups can be used by defining a new value m' that varies at every subframe. For the region indicated by 0 in Table 2, the value m' can be set with a value recorded at the UE or received through high layer signaling typically, m' is set to 1. When the legacy UE and the evolved UE share a carrier, the entire PHICH resource group is not necessary, and accordingly, m' can be set to a value less than 1 to restrict the PHICH group allocation to the region that is not used in the second region and the region used scarcely in the first region.

Figure 5:
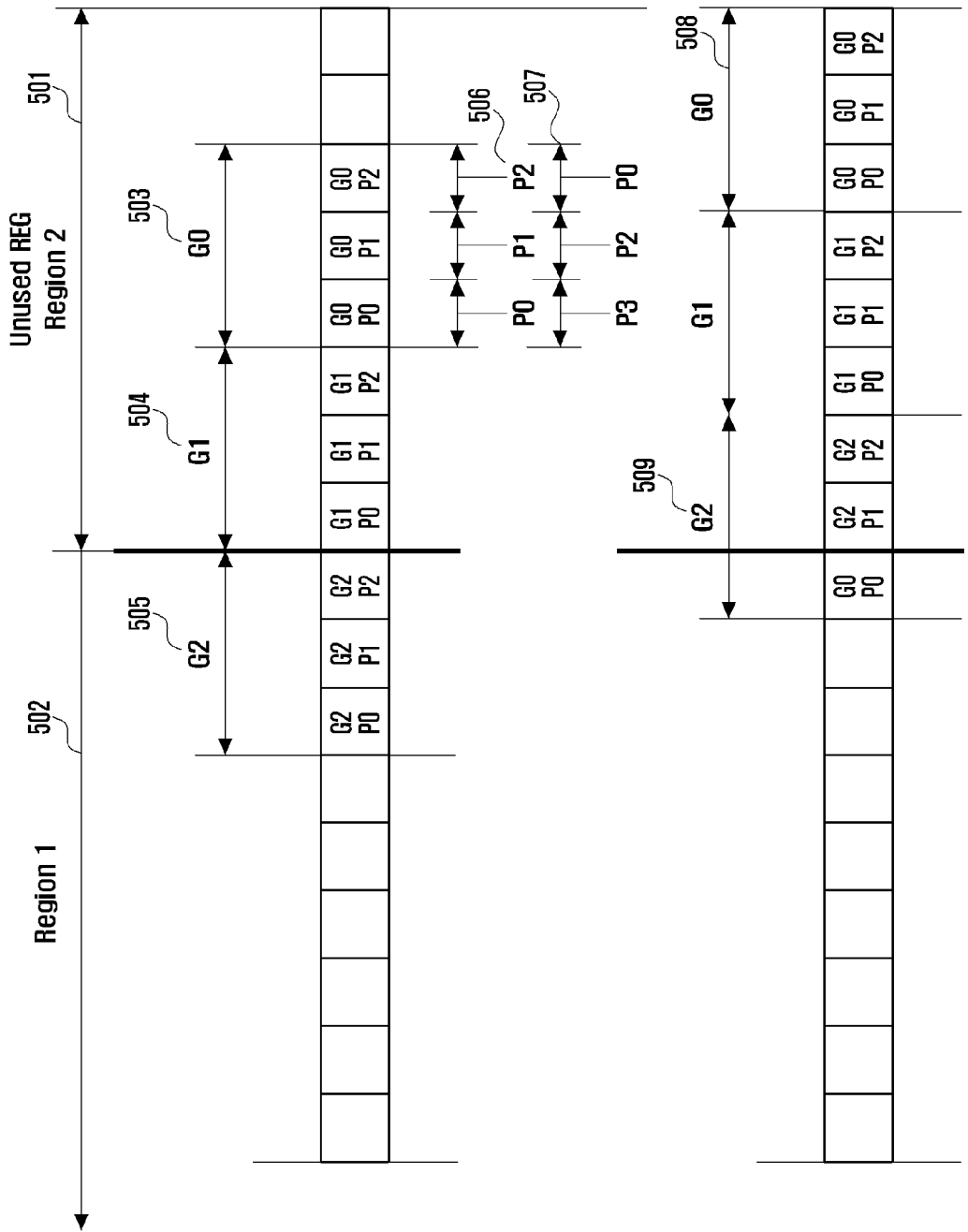
FIG. 5 is a diagram illustrating a resource allocation method according to a first embodiment of the present invention.

FIG. 5 is a diagram illustrating a resource allocation method according to a first embodiment of the present invention.

Referring to FIG. 5, when the resource allocation for PHICH groups is performed in an inverse order with respect to the second region, there are two available approaches for assigning the PHICH group to the REG. Also, there are also two available approaches for mapping the PHICHs to the REs in a PHICH group. When allocating PHICH groups as shown in FIG. 4, the PHICH resource allocation can be performed such that three REGs are included in a single CCE in the first region, or performed without consideration of whether the three REGs are included in a single CCE in the first region. In the following example, the PHICH group 505 is allocated at the last REG of the first region 502. The three REGs forming the PHICH group allocated in the first region 502 are included in one CCE so as to avoid the resource waste caused by allocating the PHICH group in two CCEs. However, there is a shortcoming in that the some REGs remain unused at the right side of the PHICH group 503. In the next example, the PHICH group is allocated in descending order of the REG index in the second region 501. In this case, although it is possible to use the REGs of the second region 501, the PHICH group may be allocated across several CCEs in the first region 502. The PHICH allocation in a group can be performed in one of ascending order of the REG index and descending order the of REG index as the PHICH group indexing.

Figure 6:
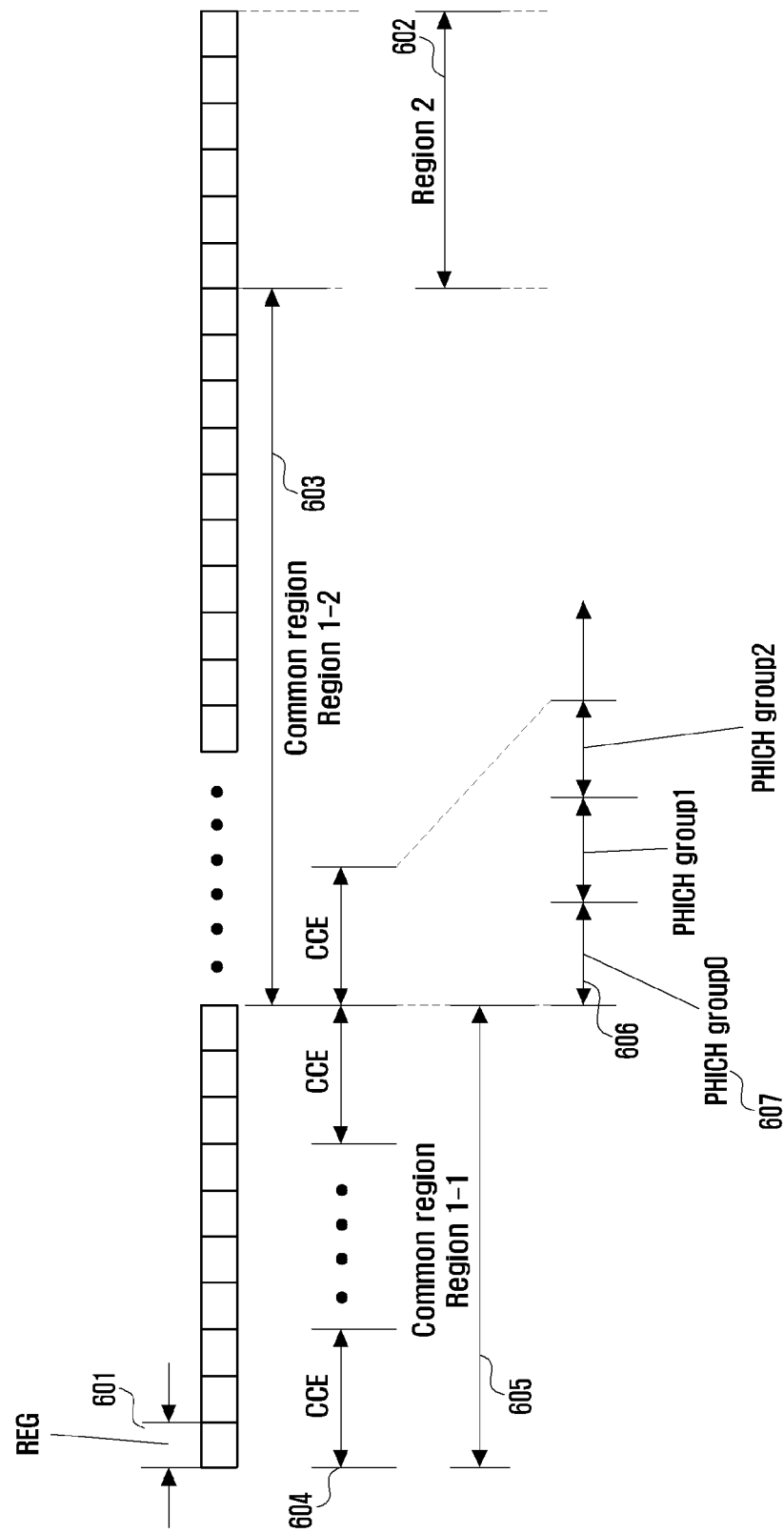
FIG. 6 is a diagram illustrating a PHICH resource allocation method according to a second embodiment of the present invention.

FIG. 6 is a diagram illustrating a PHICH resource allocation method according to a second embodiment of the present invention.

Referring to FIG. 6, a first region includes Region 1-1 605 for common control channel transmission and Region 1-2 603 for UE-specific control channel transmission.

The REG following Region 1-1 605, in which the REG resource indices are maintained regardless of the number of RSs in the REGs of Region 1-2 603, the number of PRBs, and PCFICH is used for PHICH resource allocation. This method according to an embodiment of the present invention allows for an evolved UE to use resources indicated by a predetermined index for PHICH transmission. Although the PHICH resource allocation method according to the second embodiment is capable of reducing the calculation operations required due to the variation of the number of REGs at every subframe as in the first embodiment. The REGs that do not carry any PCFICHs form REG 601. Each CCE 604 contains nine REGs 601. The Region 1-1 605 includes the first sixteen CCEs 605, and the Region 1-2 603 includes the CCEs following the Region 1-1 605 before the second region 602. According to this embodiment of the present invention, by allocating the PHICH groups from the CCE 606 indicated by the index 16, the PHICH groups 0, 1, and 2 are mapped to the CCE index 16 in sequence.

Figure 7:
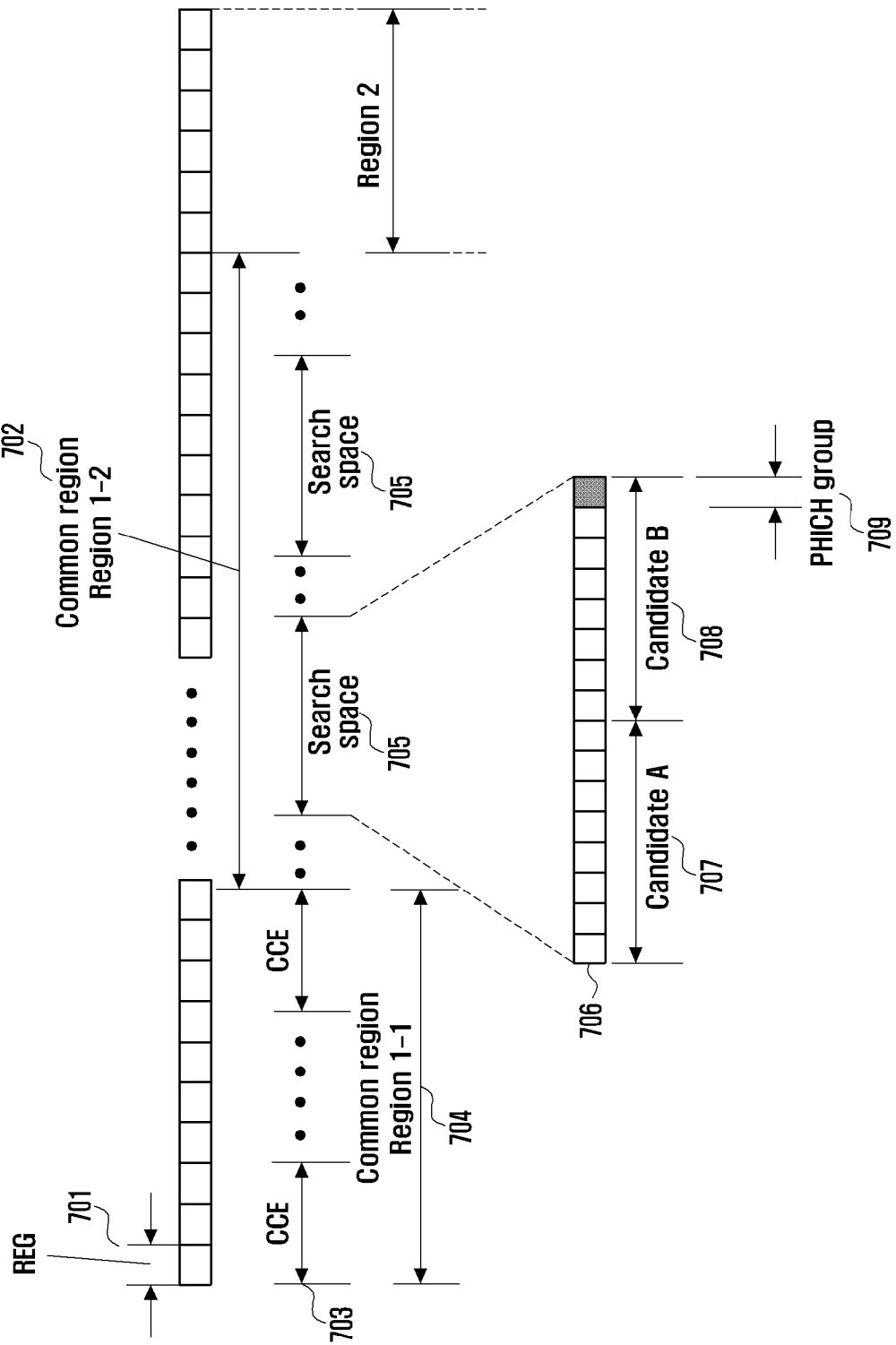
FIG. 7 is a diagram illustrating the PHICH transmission method according to a third embodiment of the present invention.

FIG. 7 is a diagram illustrating a PHICH transmission method according to a third embodiment of the present invention.

Referring to FIG. 7, the PHICH is transmitted in Region 1-2 702 carrying the UE-specific control channel. Using a part of the PDCCH resource transmitted to each UE, the PHICH is transmitted. When the PHICH is transmitted to the evolved UE using eight CCEs 707 or 708. Seven CCEs are used for PDCCH transmission, and the remaining one CCE 709 is used for PHICH transmission.

When using a part of the resources already allocated, it is possible to transmit the PHICH without influencing the PDCCH for the legacy UE and without extra resource allocation. Since the UE-specific control channel region 705 is checked in advance for PDCCH reception, it is possible to receive the PHICH without extra PHICH resource allocation or extra resource allocation signaling. The location of PHICH may change according to the number of used CCEs. In order to transmit a PHICH, one CCE is used. Accordingly, if the number of CCEs used for PDCCH transmission is 1, 2, 4, or 8, and if the PHICH is transmitted along with PDCCH, it is possible to use 1, 3, or 7 CCEs for PDCCH in respective cases. Accordingly, if the size of CCE is 1, and if the CCE index of the search space is n, and if PDCCH is detected at the $n^{th}$ CCE, the UE receives the PHICH at $(n+1)^{th}$ CCE. If the size of CCE is 2, if the CCE index of the search space is m, and if PDCCH is detected at the $m^{th}$ CCE, the UE receives PHICH at $(m+1)^{th}$ CCE. If the size of CCE is 4, if the CCE index of the search space is k, and if PDCCH is detected at $k^{th}$, $(k+1)^{th}$, and $(k+2)^{th}$ CCEs, the UE receives the PHICH at $(k+3)^{th}$ CCE. If the size of CCE is 8, if the CCE index of the search space is p, and if PDCCH is detected at $p^{th}$, $(p+1)^{th}$, $(p+2)^{th}$, $(p+3)^{th}$, $(p+4)^{th}$, $(p+5)^{th}$, and $(p+6)^{th}$ CCEs, the UE receives PHICH at $(p+7)^{th}$ CCE.

According to the third embodiment of the present invention, the evolved UE may experience minor degradation of PDCCH reception performance. However, such a minor performance degradation caused by resource reduction can be compensated by adjusting the transmit power of the eNB. According to the third embodiment, it is advantageous to avoid collision with other control channels. The third embodiment is directed to the case where the PHICH group to be transmitted has a functional relationship with the control channel search region of the UE. The PHICH resource can be allocated at another CCE rather than the exemplified CCE. When search spaces of different UEs are overlapped with each other, the PHICHs of the UEs can be multiplexed into a PHICH group.

Figure 8:
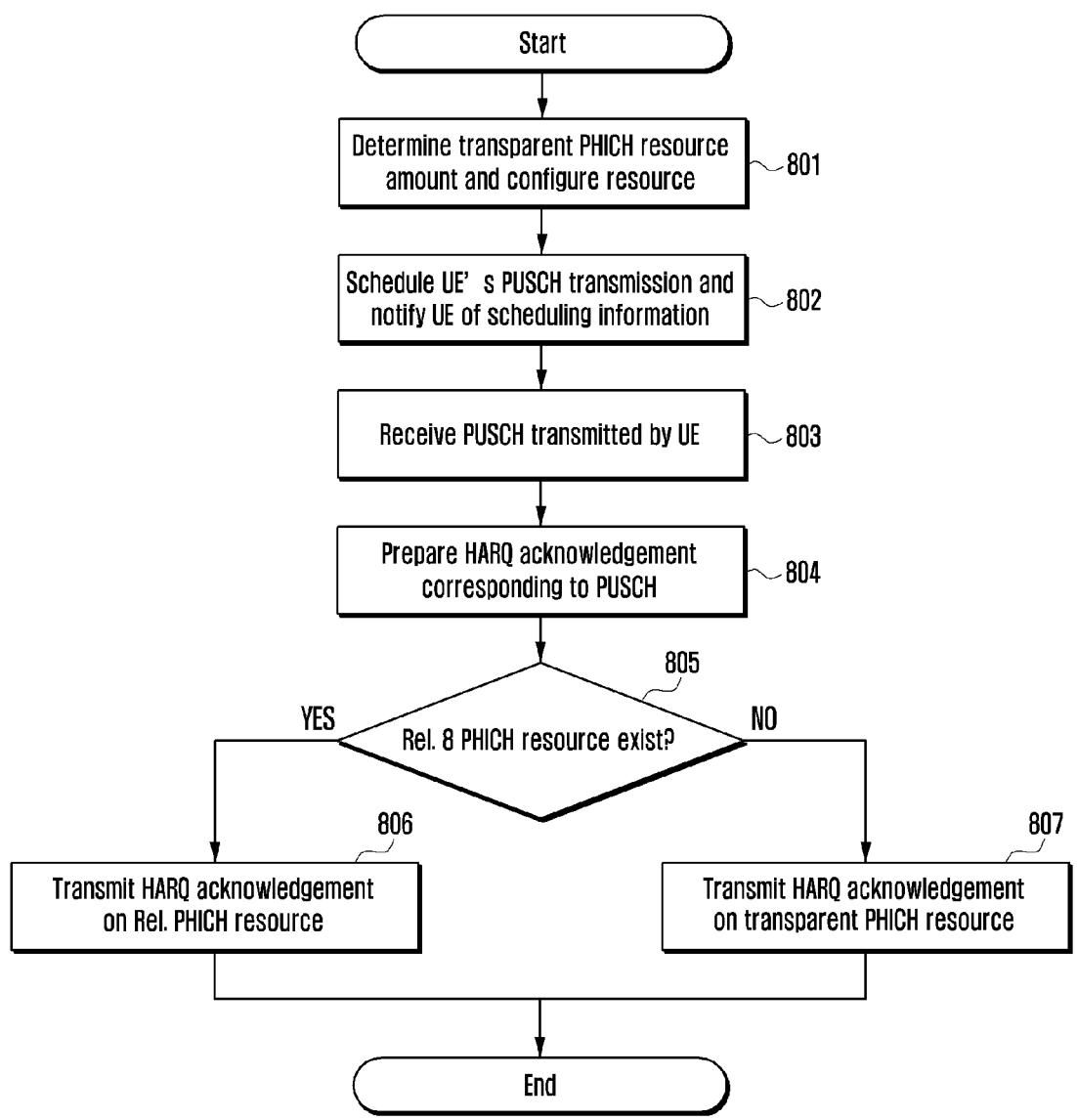
FIG. 8 is a flowchart illustrating a PHICH transmission method according to an embodiment of the present invention.

FIG. 8 is a flowchart illustrating a PHICH transmission method according to an embodiment of the present invention.

Referring to FIG. 8, an eNB determines an amount of extended PHICH resources transparent to the legacy UE and configures the resources at step 801. These extended PHICH resources can be secured by reuse of normal PHICH resources or by allocating additional resources in proportion to the normal amount of PHICH resources. The eNB performs Physical Uplink Shared CHannel (PUSCH) scheduling for the UE and notifies the UE of the uplink grant through a UE-UE specific control channel at step 802. The eNB receives the PUSCH transmitted by the UE, at step 803. Next, the eNB prepares a HARQ acknowledgement corresponding to the received PUSCH at step 804. The eNB checks whether the UE has any previously allocated PHICH resources at the current subframe at step 805. If the UE has a previously allocated PHICH resource, the eNB transmits the HARQ acknowledgement to the UE on the previously allocated PHICH resource at step 806. If the UE does not have any previously allocated PHICH resources, the eNB transmits the PHICH at an extended PHICH resource region defined according to one of the above-described embodiments of the present invention at step 807.

Figure 9:
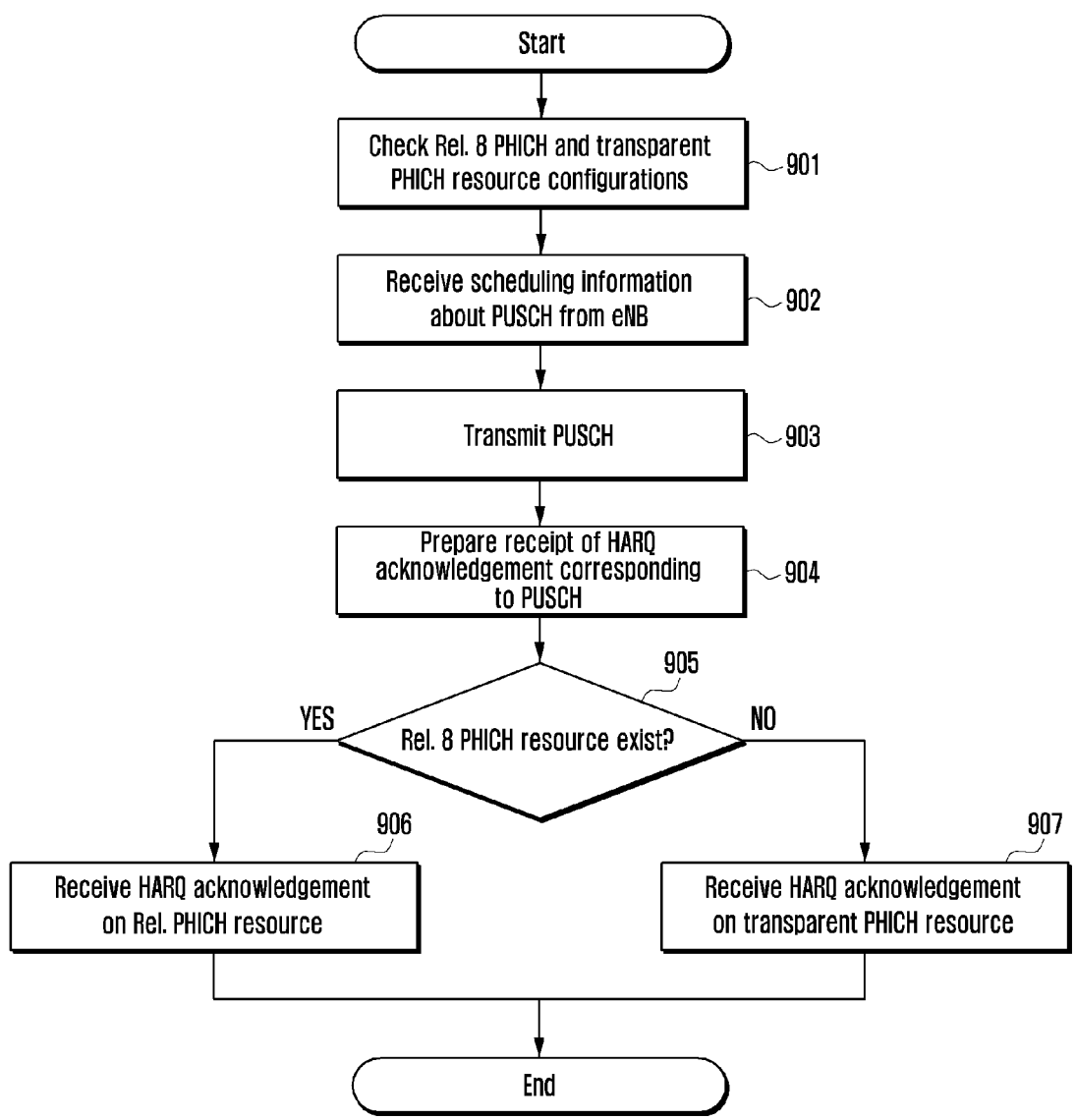
FIG. 9 is a flowchart illustrating a PHICH reception method according to an embodiment of the present invention.

FIG. 9 is a flowchart illustrating a PHICH reception method according to an embodiment of the present invention.

Referring to FIG. 9, a UE checks a normal PHICH resource and the extended transparent PHICH resource configurations at step 901. The normal PHICH resource configuration can be checked based on information received through a Physical Broadcast CHannel (PBCH), such as in legacy systems and the extended PHICH resource configuration can be checked by referencing the legacy PHICH resource configuration. Next, the UE receives the scheduling information for uplink data transmission from the eNB through the control channel at step 902. The UE transmits a PUSCH based on the control information provided by the eNB at step 903. The UE prepares receipt of the HARQ acknowledgement corresponding to the transmitted PUSCH at step 904. The UE determines whether the current subframe has previously-allocated normal PHICH resources for carrying the current HARQ acknowledgement at step 905. If the normal PHICH resources exist, the UE receives the HARQ acknowledgement on the normal PHICH resource at step 906. Otherwise, if normal PHICH resources do not exist, the UE receives the PHICH at the extended PHICH region defined according to an embodiment of the present invention at step 907.

Figure 10:
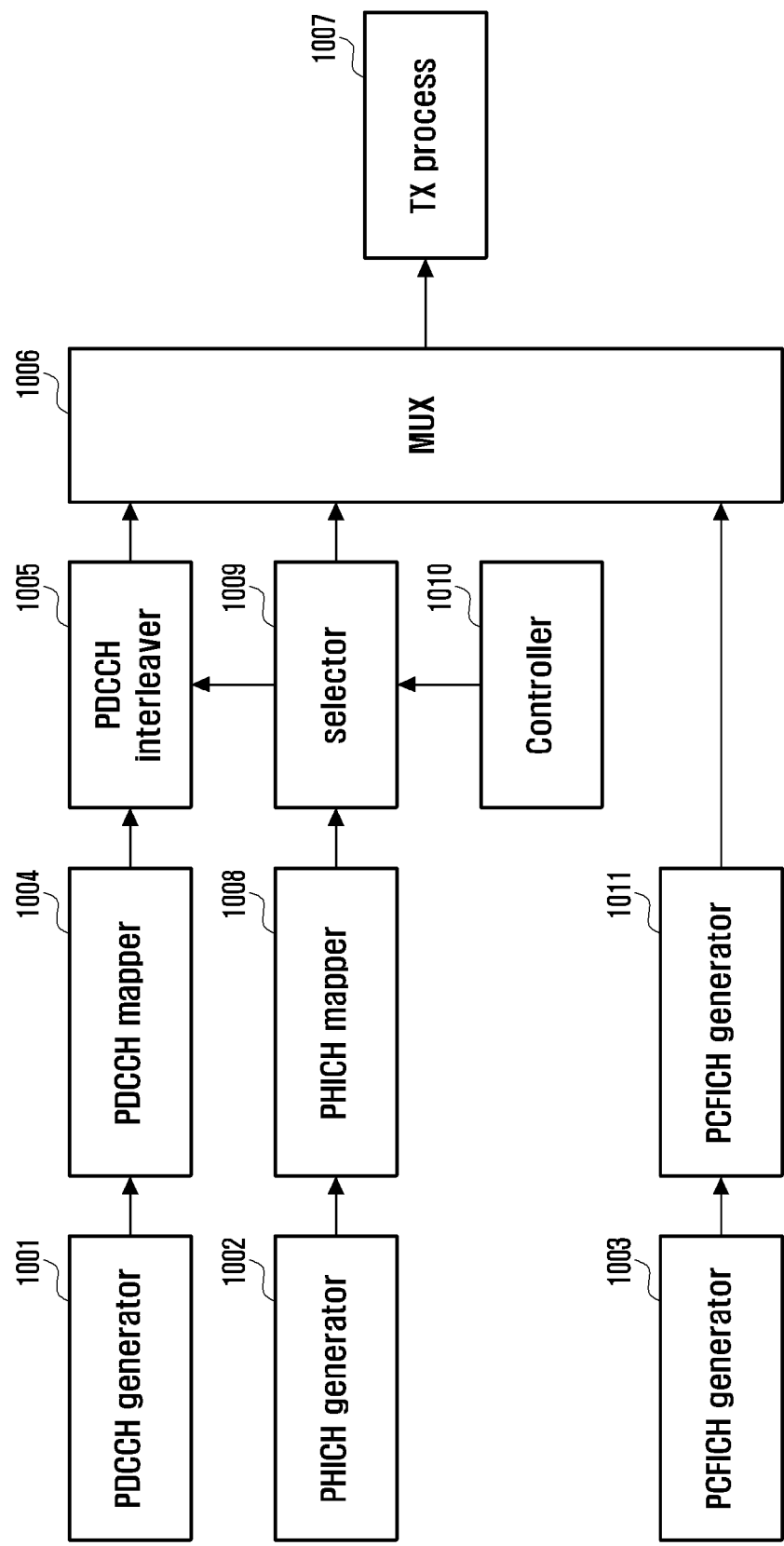
FIG. 10 is a block diagram illustrating a configuration of an eNB transmitter according to an embodiment of the present invention.

FIG. 10 is a block diagram illustrating a configuration of the eNB transmitter according to an embodiment of the present invention.

Referring to FIG. 10, the eNB transmitter according to an embodiment of the present invention may transmit a normal PHICH and/or an extended PHICH. The PDCCH generator 1001 generates a physical downlink control channel. The PHICH generator 1002 generates a HARQ acknowledgement channel. The PCFICH generator 1003 generates a PCFICH. The PDCCH mapper 1004, the PHICH mapper 1009, and the PCFICH mapper 1011 map the PDCCH, the PHICH, and the PCFICH to the respective channel resources. The PDCCH mapper 1004 maps the PDCCH to the UE-specific control channel region. The PCFICH mapper 1011 maps the PCFICH to cell-specific locations. The controller 1010 determines whether the current subframe has a normal PHICH resource region. If the current subframe has a normal PHICH resource region, the selector 1009 controls the PHICH mapper 1008 to map the PHICH to a part of the normal PHICH resources. If the current subframe does not have any normal PHICH resource regions, the selector 1009 controls the PHICH mapper 1008 to map the PHICH to an extended PHICH resource region defined according to an embodiment of the present invention. The control channels mapped to the corresponding resources are multiplexed into a subframe by the multiplexer 1006. The transmitter 1007 transmits the subframe.

Figure 11:
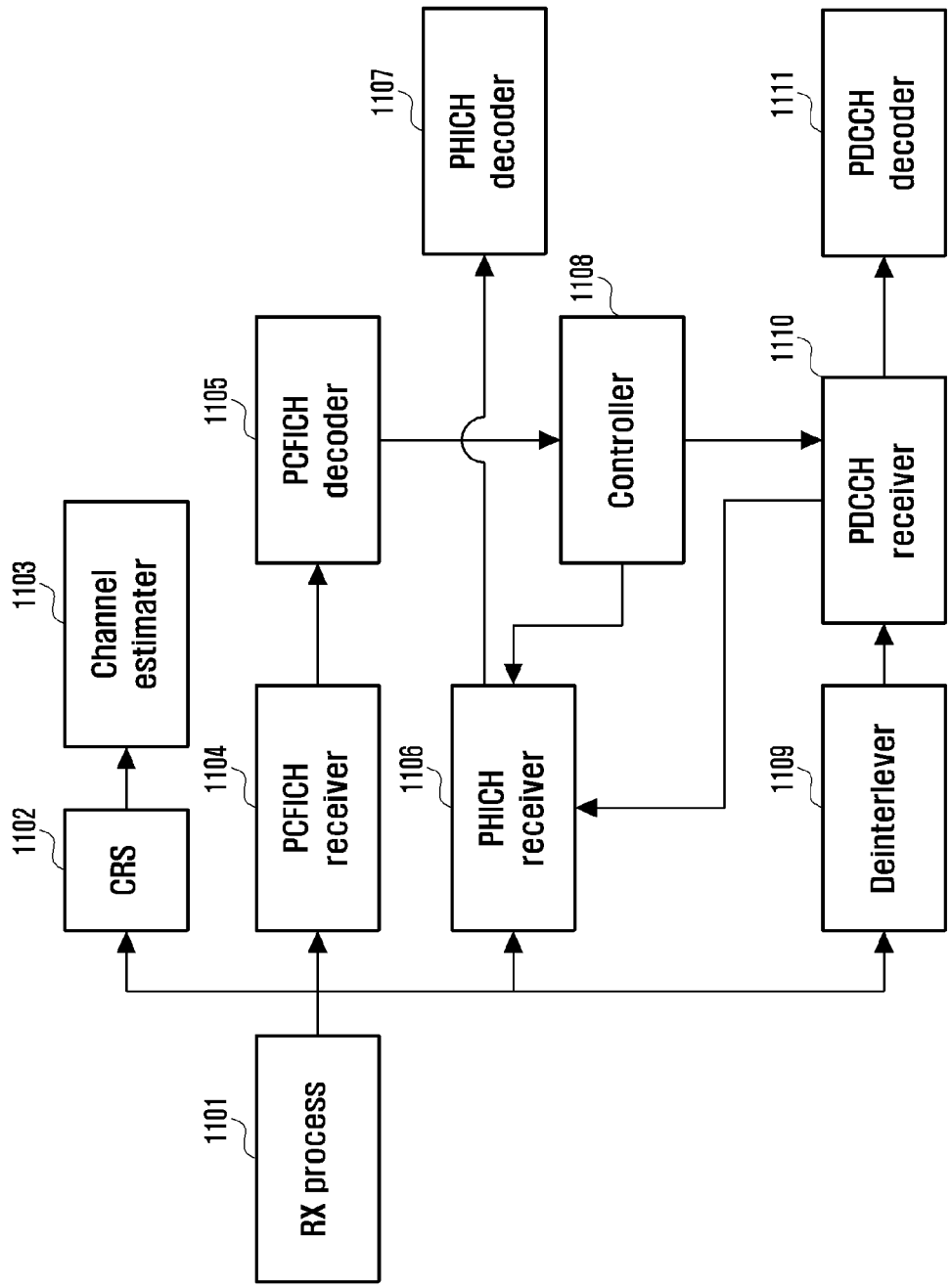
FIG. 11 is a block diagram illustrating a configuration of a UE receiver according to an embodiment of the present invention.

FIG. 11 is a block diagram illustrating a configuration of a UE receiver according to an embodiment of the present invention.

Referring to FIG. 11, a UE receiver according to an embodiment of the present invention is capable of receiving both a normal PHICH and an extended PHICH. The reception processor 1101 receives a subframe. The CRS receiver 1102 receives a CRS. The channel estimator 1103 estimates a channel based on the CRS to use the estimated channel to receive another channel. The PCFICH receiver 1104 receives a PCFICH. The PCFICH decoder 1105 demodulates the received PCFICH to acquire "L", which indicates the size of control channel. The PCFICH decoder 1105 checks the total number of REGs and REG indices. The controller 1108 determines, based on the checked information, whether the corresponding subframe has the normal PHICH and, if the subframe has the normal PHICH, the controller 1108 receives the PHICH at a predetermined location through the PHICH receiver 1104 and the signals on the REGs, except for the entire PHICH resource region, to the control channel demultiplexer 1109. The PDCCH receiver 1110 receives PDCCH. The PDCCH decoder 1111 decodes the PDCCH to acquire the control channel information. If the current subframe carries the extended PHICH, but does not carry the normal PHICH, the controller 1108 controls the PHICH receiver 1104 to receive the PHICH on the extended PHICH region and controls the PHICH decoder 1107 to decode the PHICH to acquire a HARQ acknowledgement. At this time, the de-interleaver 1109 de-interleaves the signal regardless of whether the PHICH is received.

Although not depicted in the drawings, a UE receiver according to an embodiment of the present invention may also include a communication unit. The communication unit receives control signals for receiving the second control channel through higher layer signaling.

The controller 1108 determines the second control channel resource based on the control information and determines the first control channel resource according to the predetermined second control channel resource in the entire control channel resource. In this case, the control information includes at least one of Physical Resource Block (PRB) for the second control channel, antenna port used for dedicated reference signal, scrambling code ID, and Downlink Control Information (DCI) format size.

As described above, HARQ acknowledgement transmission methods and apparatuses according to certain embodiments of the present invention are capable of securing extended HARQ acknowledgement channel resource while maintain backward compatibility with legacy communication systems, receiving a HARQ acknowledgement channel without extra signaling or information, transparently transmitting an extended control channel, receiving the HARQ acknowledgement channel on a resource that does not carry any other control channels, receiving the HARQ acknowledgement at a part of the control channel region for the UE, and/or decoding an extended HARQ acknowledgement based on the information about the normal HARQ acknowledgement.

It is to be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one executable instruction for performing specific logic function(s). Moreover, the functions of the blocks may be performed in a different order through various modifications. For example, two successive blocks may be performed substantially at the same time, or may be performed in reverse order according to their functions.

Herein, the term "module", according to the embodiments of the invention, refers to a software or hardware component, such as a Field Programmable Gate Array (FPGA) or Application Specific Integrated Circuit (ASIC) that performs certain tasks. A module may advantageously be configured to reside on the addressable storage medium and configured to be executed on one or more processors. Thus, a module may include, for example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they are executed by one or more CPUs in a device or a secure multimedia card.

Although embodiments of the present invention have been described in detail hereinabove with specific terminology, various other changes and modifications can be made without departing from the spirit and scope of the invention, as defined by the appended claims and their equivalents.

What is claimed is:

1. A Physical Hybrid Automatic Repeat reQuest (HARQ) Indicator CHannel (PHICH) transmission method performed by a base station, comprising:
   receiving two or more physical Uplink Shared Channels (PUSCHs) from a User Equipment (UE) using two or more carriers, the two or more PUSCHs corresponding to different Time Division Duplexing (TDD) configurations;
   generating two or more HARQ response information corresponding to the two or more PUSCHs;
   determining whether a PHICH resource is allocated to each current subframe, based on the TDD configurations;
   allocating a new PHICH resource at a current subframe to which the PHICH resource is not allocated; and
   transmitting the PHICHs through the allocated PHICH resources for the two or more HARQ response information.

2. The PHICH transmission method of claim 1, wherein allocating the new PHICH resource includes configuring, as the allocated new PHICH resource, a resource that is allocated for a Physical Downlink Control Channel (PDCCH) but that is not used for PDCCH transmission.

3. The PHICH transmission method of claim 1, wherein allocating the new PHICH resource includes configuring, as the allocated new PHICH resource, a region immediately following a common control channel transmission region.

4. The PHICH transmission method of claim 1, wherein allocating the new PHICH resource includes configuring a part of a terminal-specific control channel as the allocated new PHICH resource.

5. A Physical Hybrid Automatic Repeat reQuest (HARQ) Indicator CHannel (PHICH) reception method performed by a terminal, comprising:
   transmitting two or more physical Uplink Shared Channels (PUSCHs) using two or more carriers, the two or more PUSCHs corresponding to different Time Division Duplexing (TDD) configurations;
   determining whether a PHICH resource is allocated to each current subframe, based on the TDD configurations;
   identifying a new PHICH resource at a current subframe to which the PHICH resource is not allocated; and
   receiving the PHICHs through the allocated and identified PHICH resources for the two or more HARQ response information.

6. The PHICH reception method of claim 5, wherein the new PHICH resource includes a resource that is allocated for a Physical Downlink Control CHannel (PDCCH) but that is not used for PDCCH transmission.

7. The PHICH reception method of claim 5, wherein the new PHICH resource includes a region immediately following a common control channel transmission region.

8. The PHICH reception method of claim 5, wherein the new PHICH resource includes a part of a terminal-specific control channel.

9. A base station for transmitting a Physical Hybrid Automatic Repeat reQuest (HARQ) Indicator CHannel (PHICH), the base station comprising:
   a controller configured to:
      receive two or more physical Uplink Shared Channels (PUSCHs) from a User Equipment (UE) using two or more carriers, the two or more PUSCHs corresponding to different Time Division Duplexing (TDD) configurations;
      generate two or more HARQ response information corresponding to the two or more PUSCHs; and
      determine whether a PHICH resource is allocated to each current subframe, based on the TDD configurations;
   a selector configured to allocate a new PHICH resource at a current subframe to which the PHICH resource is not allocated; and
   a transmitter configured to transmit the PHICHs through the allocated PHICH resources for the two or more HARQ response information.

10. The base station of claim 9, wherein the selector configures, as the PHICH resource, a resource that is allocated for a Physical Downlink Control CHannel (PDCCH) but not used for PDCCH transmission, or a resource that has a lowest probability of PDCCH transmission.

11. The base station of claim 9, wherein the selector configures, as the PHICH resource, a region that immediately follows a common control channel transmission region.

12. The base station of claim 9, wherein the selector configures a part of a terminal-specific control channel as the PHICH resource.

* * * * *